No. 631,540. Patented Aug. 22, 1899.
G. C. HENNING.
INDICATOR FOR USE IN TESTING MATERIALS.
(Application filed Mar. 24, 1897.)

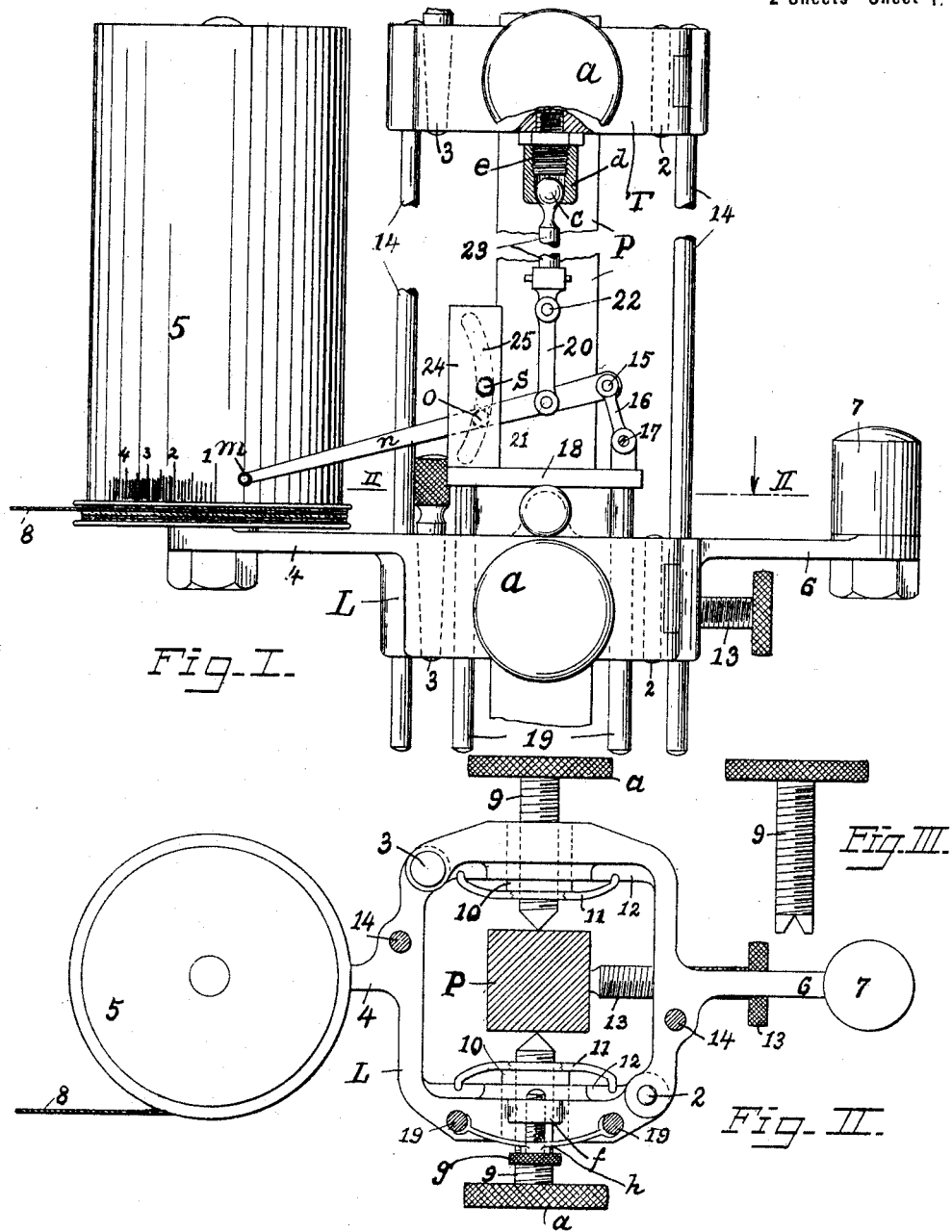

(No Model.) 2 Sheets—Sheet 2.

Witnesses:
Chas. W. Thomas.
Frank Ryall.

Inventor,
Gustavus C. Henning
By his Attorney
Richard W. Barkley.

THE NORRIS PETERS CO., PHOTO-LITHO., WASHINGTON, D. C.

UNITED STATES PATENT OFFICE.

GUSTAVUS C. HENNING, OF NEW YORK, N. Y.

INDICATOR FOR USE IN TESTING MATERIALS.

SPECIFICATION forming part of Letters Patent No. 631,540, dated August 22, 1899.

Application filed March 24, 1897. Serial No. 628,959. (No model.)

*To all whom it may concern:*

Be it known that I, GUSTAVUS C. HENNING, a citizen of the United States, and a resident of New York city, in the county of New York and State of New York, have invented certain new and useful Improvements in Indicators for Use in Testing Materials, of which the following is a specification.

This invention relates primarily to portable apparatus for indicating or recording the behavior of materials under strain, as of compression or extension, the invention being intended for use in that class of machines used for testing the strength of materials. In some laboratories the present method is to record the loads at elastic limit and at maximum strain by hand and to measure the elongation after rupture. Sometimes, though rarely, the changes of length within the elastic limit are measured for the purpose of determining the modulus of elasticity. In other cases recording instruments are used to obtain a graphic record to a point below but near the point of maximum strain or rupture, such records being on an enlarged scale throughout. In the latter cases the recording instruments are especially designed for the particular machines on which they are to be used and are non-portable, complicated, expensive, and wanting in accuracy of their records, besides being time-robbers. These old recorders are always removed from the test-pieces before the point of maximum strain is reached in order that they may not suffer damage when rupture occurs.

The objects of the present invention are to correctly indicate or record the behavior of the material under test, to so indicate or record to and including the instant of rupture, to simplify the construction of the apparatus, to produce a portable apparatus capable of attachment to or use in any testing-machine, to indicate or record the elongation first on an enlarged scale and then to change the scale automatically as to the natural scale, to quickly attach and detach the apparatus to and from the test-piece, to attach the frame of the indicator or recorder to the test-piece by spring-cushioned or spring-carried clamps which coact with the test-piece, and other objects, as will hereinafter more fully appear.

From the diagrams obtained by my new apparatus the stresses and strains at elastic limit and at rupture, as well as the modulus of elasticity, are easily calculated or measured off.

To these ends the invention includes various combinations of devices hereinafter described, and more particularly pointed out in the concluding claims.

The preferred form of the invention is shown in the accompanying drawings, forming part of this specification, in which—

Figure I is a side elevation, shortened as to height so as to accommodate the drawing to the size of the sheet. Fig. II is a plan view, partly in section, on the plane indicated in Fig. I by the line II II. Fig. III is a side view of a modified form of clamping-screw. Fig. IV is a side elevation showing a modified form of the invention. Fig. V is a plan view of the same. Fig. VI is a plan view of a second modification.

There are two openable closed frames or castings for supporting or carrying the working parts of the apparatus. The lower one of these frames is marked with the reference-letter L and the upper with the reference-letter T. These frames are, or at least may be, alike in several particulars. In the drawing these frames are shown as formed of two right-angled pieces, which are hinged together at one end, as at 2, and are secured or pinned together by the removable pin 3, which itself would form a hinge or axis were the pin at 2 removed. In order to afford a secure hold, the pin 3 and the holes in the two parts of the frame are tapered to fit each other.

The lower frame is provided with oppositely-placed horizontally-extending arms 4 and 6. The arm 4 has the rotatable drum loosely mounted thereon, but connected therewith by a spiral spring, (not shown,) while the arm 6 is provided with a counterweight 7. The two parts of frames L and T are provided with the clamping-screws 9, which are provided with knurled or milled heads *a* or other means whereby they may be turned. These screws 9 engage screw-threaded perforations in the nuts 10, which are free to slide in perforations in the frames L and T. These nuts 10 are fastened in any suitable way to the leaf-springs 11, as by screw-threads, so as to move with the same. The parts of the frames L and T are provided with stiffening ribs or flanges 12 on the arms thereof, through which the screws 9 pass, and the springs 11 have their ends forked and straddle these ribs and are so prevented from turning. This of course prevents the nuts 10 from turning in the frames.

It is noted that the springs 11 bear against the frames L and T closely adjacent the corners or angles thereof, whence it results that the pressure between the screws 9 and the test-piece is transmitted to the frames L and T in suchwise that the strain thereon tends to stretch or elongate but not to bend the bars of the frames. Of course such strains are too small to stretch these bars at all. This arrangement of the springs and frames is an important feature of the invention, since disturbance of the adjustment of the instrument with consequent error in the indication is thereby avoided.

The reference-numeral 13 marks a steadying-screw, which passes through the lower frame L and bears against the test-piece P.

The frames L and T are connected by the rods 14, which are fastened to one of the frames, as T, and pass loosely through the other of the frames, as L—that is to say, one of the frames slides on or is guided by the other or by parts connected therewith, and the two frames may be completely separated from each other. The two frames are attached to the test-piece by means of the screws 9, the steadying-screw 13 being used if requisite or convenient. The screws 9 are shown as being provided with conical points, by means of which they obtain a better or quicker bite on the test-piece. The test-piece is attached to the testing-machine in any usual or suitable way.

In order to record the behavior of the material tested, the drum 5 has a sheet of paper or the like wrapped around it, and on this paper the marker or point $m$ makes the record. This marker $m$ is carried by the arm or floating lever $n$, which is hinged at 15 to the bar or link 16, which in turn is hinged at 17 to a lug or projection from the plate 18. This plate 18 is attached to the frame L in suchwise that it can move relatively thereto to and fro in the direction of the length of the rods 14. This relative motion of the plate 18 is conveniently provided for by fastening two rods 19 thereto, the rods 19 passing easily through perforations in the frame L. It will be understood that the perforations in the frame L for the rods 14 and 19 should be parallel and that these rods should also be parallel with each other. The lever $n$ is operated from the frame T by a suitable connection, such as that now to be described. A link 20 is hinged to the lever $n$, as at 21, and to a pitman 23, as at 22. The pitman 23 is connected by a universal joint, as the ball-and-socket joint J, to the upper frame T. This ball-and-socket joint is formed by the ball $c$ on the pitman 23, the socket $d$, which is screw-threaded and engages the threaded stud $e$, which in turn is screw-tapped into the upper frame T. In order to cause the marker $m$ to move in a straight line, the lever $n$ is provided with the pin $o$ and the plate 18 with the standard 24, which is provided with a suitably-curved slot or groove 25, with which the pin $o$ engages and by which it is controlled. This is an old device long used in apparatus designed to record steam-pressures. The indication or recording on a multiplied scale of the deformation of the test-piece depends on the ratio between the lengths $m$ to 21 and 21 to 15 and may be whatever is desired or attainable. The marker $m$ may consist of a metal point, of a pen, of a pencil-lead, or other suitable or desirable substances, or it may be a pointer moved over a scale, which is moved by the running poise or weight, and the indicated strains be read off and recorded by hand without departing from this invention.

I have spoken above of changing the record or indications from the multiplied to the natural scale and will now describe one mode in which this is automatically accomplished.

It is always known approximately for a given material what the stretch up to the elastic limit will be, and it is easy to ascertain approximately the distance along the drum 5 that the pointer or marker $m$ will be moved in stretching that material to its elastic limit. I place a removable or adjustable stop $s$ in the path of the pin $o$ at such point that the turning motion of the lever $n$ about its pivot 15 will be stopped thereby, thus converting the lever $n$, link 16, and plate 18 into a rigid system which must move with the frame T during any further motion separating the latter and the frame L. Of course the indication or recording of the deformation on a multiplied scale of the test-piece ceases on the recorder or indicator whenever this locking together of the marker-operating devices and the frame T occurs.

In case it is desirable to record the behavior of the material under test the same is done by means of the marker $m$ upon paper or the like, which is wrapped around and secured to the drum 5. This drum 5 is connected with the running poise or weight in the usual way by the cord or ligament 8, the drum being thus rotated in one direction by the pull of the cord 8 and being rotated in the opposite direction by the usual spring or weight. (Not shown.) The circumferential distances of the drum represent the pull in pounds, while the axial distances represent the stretch thereunder.

The plate 18 and the parts fast thereto may be so arranged with regard to their weight that no lifting or motion thereof will occur until the pin $o$ strikes against the stop $s$. The better to guard against the possibility that the plate 18 may suffer untimely motion I sometimes apply a brake or friction device thereto. For convenience I show such a device in the drawings. Thus I sometimes provide the frame L with a lug or ear $f$. A screw $g$ engages with a screw-threaded perforation or hole in the ear $f$ and with a like perforation in the leaf-spring $h$. The ends of the spring $h$ are adapted to bear against the rods 19 and so produce the degree of friction requisite to prevent the untimely motion of the plate 18 above referred to whenever the screw $g$ is suitably adjusted. Sometimes the screw $g$ passes loosely through the spring $h$ instead of engaging a screw-threaded hole therein.

In Fig. III, I show a form of the screw 9, which is more especially adapted to use with small test-pieces, as wire, rods, and the like. This screw is adapted by a V in its wedge-shaped end to grip the wire or the like.

The operation of the apparatus is as follows: The test-piece, as a metal bar P, is inserted in the jaws of the testing-machine, as usual. The screws 9 are run out to approach each other until they are, when the frames are closed, a distance apart equal to the thickness of the test-piece less the play of the springs 11. Then the open frames are passed around the test-piece so as to inclose it, the points of the screws 9 pressing against the piece at opposite sides thereof. The frames are then closed and the taper pins 3 inserted in their holes to lock the frames. In putting on the frames as above described it is desirable that the distance apart of the sets of screws 9 carried thereby should be known or easily ascertainable. For the purpose of ascertaining this distance the rods 14 may be provided with one or more marks, to which an edge of the frame L will be brought before the frames are secured to the test-piece, or there may be a mark (or a series of marks) upon the drum 5, to which the marker $m$ will be brought before the frames are secured to the test-piece.

The cord 8 is connected with the running weight and the test is begun. As the test-piece stretches, the marker $m$ is run up or axially of the drum 5, which of course is rotated by the cord 8 and the movement of the running weight or poise. The plate 18 does not move until the pin $o$ strikes the stop $s$, until which time the record is on a multiplied scale. After the pin $o$ strikes the stop $s$ the plate 18 and its attached parts move with the frame T and the record is on the natural scale to and including the point of rupture. No injury to the apparatus results from allowing it to remain on the test-piece to and including the point of maximum strain or rupture, as the described construction allows the complete separation of the frames L and T and the indicating or recording mechanism, the last, except drum 5, going with the frame T. This separation does not often occur, as the inertia of the parts usually causes them to slip on the test-piece at the moment of rupture.

I sometimes replace the cone-pointed clamps 9 by clamps having knife-edges for bearing on the test-pieces, and I sometimes provide these knife-edges with central V-shaped notches, all as shown in Fig. III. These notches are particularly useful when test-pieces of very small diameters are under examination.

While I have described the illustrated form of my invention at length, I am not to be understood as limiting myself to the form or to the details thereof shown and described, for many changes in elements of combinations and in details may be made without departing from the spirit of my invention. Thus, for example, the frames L and T instead of being hinged and pinned at opposite or diagonal corners may each consist of or comprise what may be called a "U-shaped" frame, the bottom of the U being formed of two parallel bars, and the hinged part of the frame may likewise consist of two parallel bars. The screws 9 in this case pass loosely through perforations in the parallel bars aforesaid, and instead of engaging with nuts 10 they may engage directly with threaded perforations in the springs 11. Again, while I have hereinbefore described the nut 10 as being fixed against rotation and the screws 9 as being the element that is rotated it is plain that this arrangement may be inverted and the screw be the element that is held against rotation, as by a longitudinal slot therein and a pin in the frame, and the nut be the element that is rotated. In this case the nut would work between the frame, as L or T, and the spring 11, not being fastened to the latter. Again, the frame L may be provided with tubes N, projecting toward the frame T, and the rods 14 may slide within the said tubes, thus obtaining a longer bearing. Again, the rods 19 of the plate 18 may slide within split tubes L', projecting from the frame L, the split tubes exerting by their resiliency a slight pressure upon the rods 19, thus furnishing a brake or friction device therefor. The foregoing modifications are illustrated in Figs. IV, V, and VI of the drawings. The foregoing are some of the changes that may be made without departing from the scope of my invention.

Having thus fully described the nature of my invention, what I claim as new, and desire to secure by Letters Patent, is—

1. In an indicator for testing-machines the combination of two closed frames elastically attachable to test-pieces, motion-multiplying indicating mechanism therefor loosely carried and guided by one of said frames, a connection between said mechanism and the other frame, and a stop for the multiplying devices, whereby the scale of the indication is changed, substantially as described.

2. In an indicator for testing-machines the combination of two closed frames elastically attachable to test-pieces, motion-multiplying indicating mechanism therefor loosely carried and guided by one of said frames, a connection between said mechanism and the other frame, and an adjustable stop for the multiplying devices, whereby the scale of the indication is changed, substantially as described.

3. In an indicator for testing-machines the combination of two closed frames slidable one on the other, and elastically attachable to test-pieces, motion-multiplying indicating mechanism therefor loosely carried and guided by one of said frames, a connection between said mechanism and the other frame, and a stop for the multiplying devices, whereby the scale of the indication is changed, substantially as described.

4. In an indicator for testing-machines, the combination of two closed frames slidable one on the other, and elastically attachable to test-pieces, motion-multiplying indicating mechanism therefor loosely carried and guided by one of said frames, a connection between said mechanism and the other frame, and an adjustable stop for the multiplying devices, whereby the scale of the indication is changed, substantially as described.

5. In an indicator for testing-machines, the combination of two frames attachable to the test-pieces, motion-multiplying indicating mechanism operated by said frames, and automatic means for changing the scale of the indication during the progress of the test, substantially as described.

6. In an indicator for testing-machines, the combination of two frames attachable to the test-pieces, motion-multiplying indicating mechanism operated by said frames, and automatic means for changing the scale of the indication and provided with an adjustable member for varying the points of such change, substantially as described.

7. In an indicator for testing-machines, the combination of a frame, two oppositely-placed internally-threaded nuts in openings in said frame, screws engaging said nuts and adapted to engage a test-piece one of said screw and nut elements being fixed against rotation and the other being rotatable, and springs acting between or on said nuts and frame to move the screws toward each other, substantially as described.

8. In an indicator for testing-machines, the combination of the frame consisting of two perforated parts hinged and fastened together, an internally-threaded nut for each of said parts in said openings or perforations, a spring for each nut acting between or on the same and the frame, and a screw for and engaging with each nut and adapted to engage with test-pieces, one of said screw and nut elements being fixed against rotation and the other being rotatable, substantially as described.

9. In an indicator for testing-machines, the combination with a hinged openable frame rigid when closed, of spring-cushioned clamps carried by said frame for coaction with the test-piece, substantially as described.

10. In an indicator for testing-machines, the combination with a hinged openable frame rigid when closed, of clamps sliding on said frame, and springs connecting said clamps and said frame, substantially as described.

11. In an indicator for testing-machines, the combination of the two frames, each consisting of two perforated parts hinged and fastened together, an internally-threaded nut for each of said parts in said perforations or openings, a spring for each nut acting between or on the same and the corresponding frame, a screw for and engaging with each nut and adapted to engage with test-pieces, one of said screw and nut elements being fixed against rotation and the other being rotatable, and indicating or marking mechanism operated by said frames, substantially as described.

12. In an indicator for testing-machines, the combination of the two frames, each consisting of two perforated parts hinged and fastened together, an internally-threaded nut for each of said parts in said perforations or openings, a spring for each nut acting between or on the same and the corresponding frame, a screw for and engaging with each nut and adapted to engage with test-pieces, one of said screw and nut elements being fixed against rotation and the other being rotatable, guides for one frame secured to the other of said frames, and indicating mechanism operated by said frames, substantially as described.

13. In an indicator for testing-machines, the combination of two frames attachable to the test-pieces, guides for one of said frames secured to the other of said frames, motion-multiplying indicating mechanism operated by said frames, and automatic means for changing the scale of the indication, substantially as described.

14. In an indicator for testing-machines, the combination of two frames attachable to the test-pieces, guides for one of said frames secured to the other of said frames, motion-multiplying indicating mechanism operated by said frames, and automatic means for changing the scale of the indication and provided with an adjustable member for varying the point of such change, substantially as described.

15. In an indicator for testing-machines, the combination of two frames T, L, attachable to test-pieces, the rods 14 fast to one frame and guiding the other, the plate 18, the rods 19 fast to said plate and guided by said frame L, the motion-multiplying indicating mechanism connected to and operated by plate 18 and the said frame T, and the stop carried by plate 18 for said multiplier, substantially as described.

16. In an indicator for testing-machines, the combination of two frames T, L, attachable to test-pieces, the rods 14 fast to one frame and guiding the other, the plate 18, the rods 19 fast to said plate and guided by said frame L, the motion-multiplying indicating mechanism connected to and operated by plate 18 and the said frame T, and the adjustable stop carried by plate 18 for said multiplier whereby the point of change of the scale of the indication may be varied, substantially as described.

17. In an indicator for testing-machines, the combination of two frames, L, T, attachable to test-pieces, the guides for one of said frames fast to the other thereof, the plate 18, guides connecting plate 18 and said frame L, the motion-multiplying indicating mechanism connected to and operated by said plate 18 and the said frame T, the stop carried by plate 18 for the multiplier, and a brake or friction device for preventing undue motion of plate 18, substantially as described.

18. In an indicator for testing-machines, the combination of two independent frames attachable to test-pieces, with indicating mechanism comprised in two independent or normally separable parts carried respectively by the said two independent frames, whereby the behavior of the material tested to and including the point of rupture may be ascertained, substantially as described.

19. In an indicator for testing-machines, the combination of two independent frames attachable to test-pieces, and guided one by the other as they are moved during the operation of testing, with indicating mechanism comprised in two independent or normally separable parts carried respectively by the said two independent frames, whereby the behavior of the material tested to and including the point of rupture may be ascertained, substantially as described.

20. In an indicator for testing-machines, the combination of two independent frames attachable to test-pieces, motion-multiplying indicating mechanism comprised in two independent or separable parts and operated by said frames, and automatic means for changing the scale of indication, substantially as described.

21. In an indicator for testing-machines, the combination of two independent frames attachable to test-pieces and guided one by the other as they are moved during the operation of testing, motion-multiplying indicating mechanism comprised in two independent or separable parts and operated by said frames, and automatic means for changing the scale of indication, substantially as described.

22. In an indicator for testing-machines, the combination of two independent frames attachable to test-pieces, motion-multiplying indicating mechanism comprised in two independent or separable parts and operated by said frames, and automatic means for changing the scale of indication provided with an adjustable member for varying the point of such change, substantially as described.

23. A portable indicator for use while testing materials comprising two openable frames, spring-pressed clamps for attaching said frames to and supporting them from the test-piece, and automatically-separable motion-multiplying indicating mechanism carried by said frames, substantially as described.

24. A portable indicator for use while testing materials comprising two openable frames, spring-pressed clamps for attaching said frames to and supporting them from the test-piece, and motion-multiplying indicating mechanism carried by said frames, substantially as described.

25. A portable indicator for use while testing materials comprising two openable frames, spring-pressed clamps for attaching said frames to and supporting them from the test-piece, automatically-separable motion-multiplying indicating mechanism carried by said frames and a stop for the strain or motion multiplier, whereby the scale is changed, substantially as described.

26. A portable indicator for use while testing materials comprising two openable frames, spring-pressed clamps for attaching said frames to and supporting them from the test-piece, motion-multiplying indicating mechanism carried by said frames, and a stop for the motion-multiplier, whereby the scale of the indication is automatically changed, substantially as described.

27. A portable indicator for use while testing materials comprising two openable frames, spring-pressed clamps for attaching said frames to and supporting them from the test-piece, automatically-separable motion-multiplying indicating mechanism carried by said frames, and an adjustable stop for the motion-multiplier, substantially as described.

28. A portable indicator for use while testing materials comprising two openable frames, spring-pressed clamps for attaching said frames to and supporting them from the test-piece, motion-multiplying indicating mechanism carried by said frames, and an adjustable stop for the motion-multiplier, substantially as described.

29. A portable indicator for use while testing materials comprising hinged openable frames for surrounding the test-piece and provided with coacting guides and attachable elastically to and supported solely by the test-piece and carrying and operating indicating mechanism, substantially as described.

30. A portable indicator for use while testing materials comprising hinged openable frames for surrounding the test-piece and provided with coacting guides and attachable elastically to and supported solely by the test-piece and motion-multiplying indicating mechanism carried and operated by said frames, substantially as described.

31. A portable indicator for use while testing materials comprising frames attachable to and solely supported by the test-pieces, motion-multiplying indicating mechanism carried by said frames, and a stop for said mechanism for changing the scale of the indication during the test, substantially as described.

32. A portable indicator for use while testing materials comprising frames attachable to and solely supported by the test-pieces, motion-multiplying indicating mechanism carried by said frames, and an adjustable stop for said mechanism for changing the scale during tests, substantially as described.

33. In an indicator, the combination of two independent carriers or attachments, motion-multiplying indicating mechanism comprised in two independent or separable but coöperating parts and the motion-multiplier being operated by said carriers, and a stop for arresting said multiplier but not the indicating mechanism, whereby the scale of the indication may be changed automatically during the progress of the work, substantially as described.

34. In an indicator, the combination of two independent carriers or attachments, motion-multiplying indicating mechanism comprised in two independent or separable but coöperating parts and the motion-multiplier being operated by said carriers, and an adjustable stop for arresting said multiplier but not the indicating mechanism, whereby the scale of the indication may be changed automatically during the progress of the work and whereby the point of such change may be varied, substantially as described.

35. In an indicator, the combination of two independent carriers or attachments, motion-multiplying indicating mechanism comprised in two independent or separable parts supported by one of said carriers and the motion-multiplier being connected with the other of said carriers, and a stop for arresting the multiplier but not the indicating mechanism, whereby the scale of the indication may be changed automatically during the progress of the work, substantially as described.

36. In an indicator for testing-machines, the combination of mechanism for indicating on a multiplied scale the deformation of materials under stress, said mechanism being independent of the stress-applying mechanism, with means for automatically changing the scale of the indication at a predetermined point in the operation of said mechanism, substantially as described.

37. In an indicator for testing-machines, the combination of mechanism for indicating on a multiplied scale the deformation of materials under stress, said mechanism being independent of the stress-applying mechanism, with a stop for automatically reducing the indicating action of said mechanism to the natural scale at a predetermined point in the operation of said mechanism, substantially as described.

38. In an indicator for testing-machines, the combination for a motion-multiplying indicating mechanism in two parts one of which is provided with an indicating-surface and the other of which comprises a movable support and motion-multiplying devices carried by said support and moving independently thereof while multiplying and provided with an indicator for coaction with said surface, with means for locking said support and said devices together at and to move as a rigid system from a predetermined point in the operation of said mechanism, substantially as described.

39. In an indicator for testing-machines, the combination of a motion-multiplying indicating mechanism in two parts one of which is provided with an indicating-surface and the other of which comprises a movable support and motion-multiplying devices carried by said support and moving independently thereof while multiplying and provided with an indicator for coaction with said surface, with a stop rigidly connected with said support and arresting the multiplying action of said devices and locking the support and said devices together at and to move as a rigid system from a predetermined point in the operation of said mechanism, substantially as described.

40. In an indicator for testing-machines, the combination of an indicating-surface, an indicator coacting therewith and acting normally to indicate on an enlarged scale the behavior of material under examination, and means for automatically changing or arresting the multiplying action of the indicator at a predetermined point in the operation of the indicating apparatus, substantially as described.

41. In an indicator for testing-machines, the combination of mechanism for indicating on a multiplied scale the deformation of materials under stress, with means for automatically changing the scale of the indication at a predetermined point in the operation of said mechanism and adjustable for the purpose of varying said point, substantially as described.

42. In an indicator for testing-machines, the combination of mechanism for indicating on a multiplied scale the deformation of materials under stress, with an adjustable stop for automatically reducing the indicating action of said mechanism to the natural scale at a predetermined point (adjustable) in the operation of said mechanism, substantially as described.

43. In an indicator for use in testing-machines, the combination of a rigid frame having corners or angles, symmetrically-disposed clamps at the sides of said frame for coaction with the test-piece, and springs connected with said clamps and bearing on the frame at said corners or angles, substantially as described.

44. In an indicator for use in testing-machines, the combination of an openable rigid frame having corners or angles, symmetrically-disposed clamps for coaction with the test-piece, and springs connected with and moving said clamps and bearing on the frame at said corners or angles, substantially as described.

45. In an indicator for use in testing-machines, the combination of a rigid rectangular frame, clamps at opposite sides of the frame, and leaf-springs connected to and controlling or moving said clamps and bearing at their ends on the frame at the corners thereof, substantially as described.

46. In an indicator for use in testing-machines, the combination of an openable rectangular frame rigid when closed, opposing clamps, and leaf-springs connected to and moving said clamps and bearing at their ends on the frame at the corners of the frame, substantially as described.

47. In an indicator for use in testing-machines, the combination of a rigid rectangular frame, opposite nuts slidable freely on the frame toward and from each other, clamping-screws engaging said nuts, and flat or leaf springs fast to said nuts and bearing on the frame only at the corners thereof, substantially as described.

48. In an indicator for use in testing-machines, the combination of an openable frame rigid when closed, opposite nuts slidable freely on the frame toward and from each other, clamp-screws engaging said nuts, and flat or leaf springs fast to said nuts and bearing at their ends on the frame only at the corners thereof, substantially as described.

Signed at New York city, in the county of New York and State of New York, this 23d day of March, A. D. 1897.

GUS. C. HENNING.

Witnesses:
CHAS. A. BRODEK,
R. W. BARKLEY.